Feb. 13, 1951         A. C. OMBERG ET AL         2,541,277
NAVIGATIONAL CONTROL SYSTEM
Filed Feb. 2, 1946

ARTHUR C. OMBERG   Inventors
HAROLD GOLDBERG

By Robert T. Killman
Attorney

Patented Feb. 13, 1951

2,541,277

UNITED STATES PATENT OFFICE 2,541,277

NAVIGATIONAL CONTROL SYSTEM

Arthur C. Omberg and Harold Goldberg, Baltimore, Md., assignors to Bendix Aviation Corporation, South Bend, Ind., a corporation of Delaware Application February 2, 1946, Serial No. 645,159

5 Claims. (Cl. 235—61)

This invention relates to a system for determining the positional error of an air or water borne vehicle with respect to a track along which it is desired that the vehicle proceed. More particularly the invention relates to such a system which will generate an error voltage applicable to an automatic steering device for the correction of the error.

While systems are known to the art which will maintain a vehicle accurately on a desired course, there is, however, no assurance in the use of such systems that the course being maintained is holding the vehicle to a desired track. Even if allowances be made in the selection of a course to be steered for drift due to wind in air navigation, and to wind and water currents in sea navigation, there can be no assurance that air and water currents obtaining at the time of calculation will remain unchanged. The provision of a system which will automatically and continuously generate an error voltage applicable to an automatic steering system, thus adds greatly to the usefulness of automatic steering and relieves piloting and navigational officers of additional duties.

It is an object of this invention to provide a system for automatically and continuously determining the error between the position of a moving vehicle and a desired track.

It is another object of this invention to provide such a system which will generate a voltage proportional to the error, which voltage is applicable to automatic steering devices.

It is a further object of this invention to provide such a system which continuously plots the position of the vehicle and derives an error voltage by comparing present position with a corresponding position on a desired track line.

It is still another object of this invention to provide such a system which is simple of construction and of which the weight and space requirements are low.

The objects and advantages of the invention are obtained by the provision of a system which utilizes information as to the location of the vehicle with respect to one or more points of known location in the area being traversed. This information is obtained from devices forming part of the normal equipment of the vehicle. From this information voltages are derived in terms of a selected scale, proportional to the rectangular coordinates of the position of the vehicle on a reference chart of the area being traversed. Utilizing these voltages a marking device may be driven to continuously plot the position of the vehicle and concurrently an error voltage is derived proportional to the error of the present position of the vehicle with respect to a corresponding position on the desired track line.

Other objects and advantages of the invention will become apparent from a consideration of the following specification, when taken in conjunction with the accompanying drawing, in which.

Figure 1:
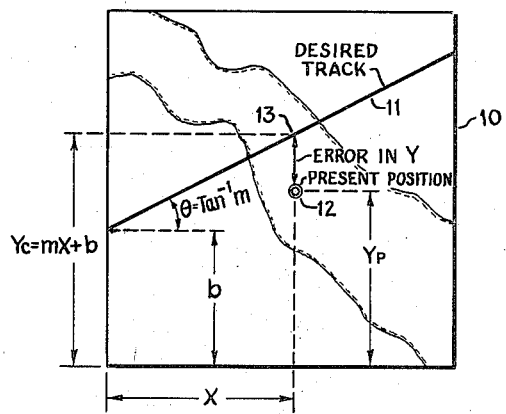
Fig. 1 is an illustration of a chart of an area being traversed by a vehicle, showing a desired track line and an indication of the present position of a craft, together with the relationship and properties of these quantities which are utilized by the invention.

Referring now more particularly to the drawing, there is shown in Fig. 1 a map or chart 10 of an area being traversed by a moving vehicle, and having indicated thereon a desired track line 11 and the present position 12 of the vehicle. Directly above the position 12 on the desired track line 11 is located a point 13 which is taken as the correct position for the vehicle.

Using the lower left hand corner of the chart as the zero point for the system, the rectangular coordinates of the present and correct positions of the vehicle are indicated. The distance from the bottom of the chart to the intersection of the desired track line with the left hand edge of the chart is indicated as $b$. The angle made by the desired track line with the horizontal edges of the chart is indicated as $\theta$. The tangent of this angle is designated $m$.

The value of the coordinate $Y_c$ of the correct position 13 may be derived from the expression.

$$Y_c = mx + b$$

where $x$ is the $x$ coordinate of both positions.

Figure 2:
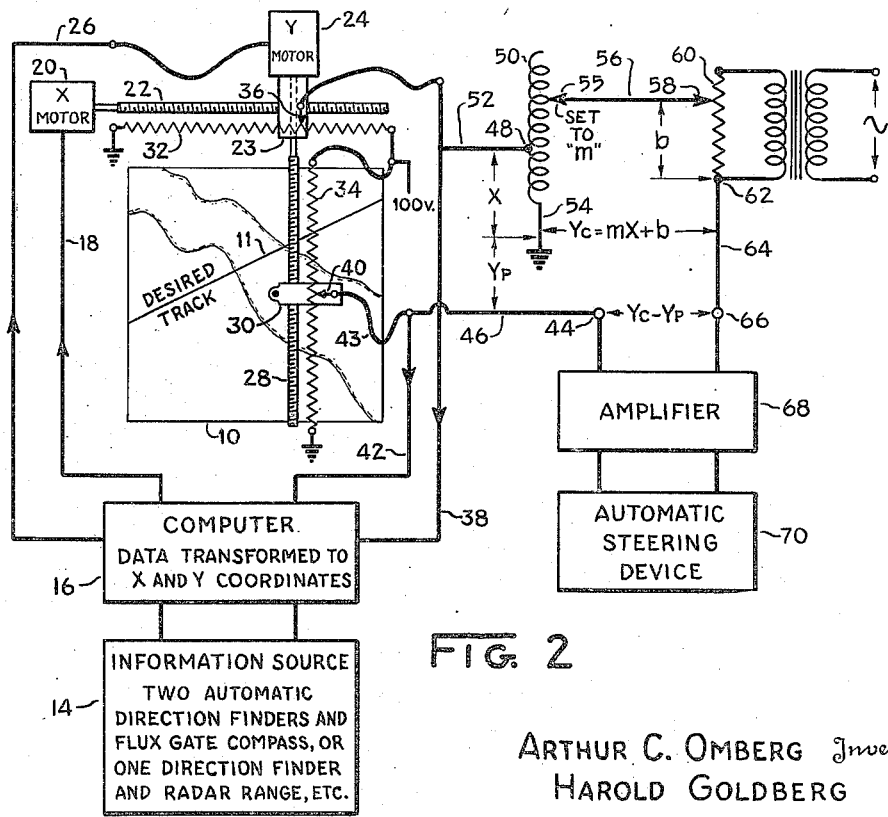
Fig. 2 is a schematic diagram of a system embodying the invention.

Referring now to Fig. 2, there is shown a system for deriving, in terms of an arbitrary scale, a voltage equal to $Y_c$ in accordance with the above equation and for likewise deriving a voltage equal to the Y coordinate of the present position of the vehicle. By a comparison of these voltages an error voltage is determined.

Block 14 indicates the source of information utilized by the system. It may comprise a pair of automatic direction finders supplying the bearings of a pair of radio transmitting stations in the area, and a flux-gate compass. Or it may consist of one automatic direction finder and a pulse echo type of range indicating system. Other combinations supplying information of position may likewise be employed, such as a plurality of echo-ranging devices supplying distance information with respect to a plurality of points of known location; or navigational devices supplying information as to the difference between the distances to such stations.

This information is fed to a computer 16 which electrically transposes it into rectangular co-ordinates of the present position of the vehicle and generates voltages proportional thereto in terms of an arbitrary voltage distance scale.

Associated with the chart 10 is an X motor 20 actuated by voltage supplied from computer 16 thru lead 18, which drives a long lead screw 22 spanning the horizontal dimension of the chart. Supported on the lead screw 22 for movement there along is a cursor 23 carrying a Y motor 24 actuated by voltage supplied through conductor 26 from the computer 16. The Y motor drives a long lead screw 28 spanning the vertical dimension of the chart. The lead screw 28 carries a cursor 30 which is mounted for movement there along. The cursor 30 carries a stylus or inking wheel for recording the track of the vehicle on the chart 10.

Extending parallel and in proximity to the lead screw 22 is a potentiometer 32 likewise spanning the full horizontal dimension of the chart 10. Similarly a potentiometer 34 extends parallel and in proximity to lead screw 28, being mounted to travel with the lead screw. Each of the potentiometers has applied across it a voltage proportional to the chart distance it spans in terms of the selected voltage distance scale. If the scale selected be, for example, one volt equals 2 miles, and the chart represents a 200 mile square, the voltage across the potentiometers would be 100 volts, as indicated. Carried by the Y motor supporting means 23 is a contact 36 which slides along potentiometer 32. The voltage intercepted by the contact 36 is fed back to the computer 16 through lead 38 to reduce the voltage supplied to X motor 20 as the stylus nears the X coordinate of the present position of the vehicle. The cursor 30 carries a contact 40 which slides along potentiometer 34, the voltage intercepted by it being fed back to the computer 16 through lead 42.

The voltages supplied by computer 16 to the X and Y motors are the voltages developed by the computer proportional to the Y and X coordinates of the present position of the vehicle, reduced by the voltages intercepted by contacts 36 and 40 across potentiometers 32 and 34 respectively. Thus as the stylus carried by cursor 30 reaches a position on the chart corresponding to that defined by the coordinate voltages developed by the computer, the voltages supplied to the X and Y motors through leads 18 and 26 are reduced to zero and the stylus is brought to rest.

The portion of the system described thus far will be found described more fully in the copending application of Arthur C. Omberg, Serial No. 642,969, for Automatic Position Plotter, filed January 23, 1946.

The determination of the error between the present position of the desired track line, can be achieved, as pointed out above, by the selection of a point on the desired track line having one of its coordinates identical with the corresponding coordinate of the present position, and comparing the remaining coordinates of the two positions. The coordinate used in determining the reference position on the desired track line should preferably be the one with which the desired track line makes the smaller angle. In the situation illustrated this would be the X coordinate. The Y coordinates of the two positions must therefore be compared. The Y coordinate of the desired or correct position is then derived from the formula $Y_c = mx + b$ as explained above.

In solving this equation and comparing the two Y coordinates use may be made of the voltages intercepted along the potentiometers 32 and 34 by the contacts 36 and 40. The contact 40 intercepts a voltage proportional to the Y coordinate of the present position which may be designated $Y_p$. This voltage is applied to a terminal 44 through a lead 46.

The voltage intercepted by contact 36 is applied to a tapping point 48 on an auto-transformer coil 50 through lead 52, the coil having one of its terminals grounded through lead 54. A conductor 56 terminates in an adjustable tapping point 55 which is located along the coil 50 at a point selected to provide an output equivalent to $mx$. The remaining terminal of conductor 56 constitutes a movable tap 58 which is adjusted along an independently excited potentiometer 60 having one of its terminals 62 connected to lead 64 to terminal 66. The position of the tapping point 58 along the potentiometer 60 is selected to intercept a voltage equivalent to the distance $b$.

Thus the voltage between conductors 54 and 46 will be proportional to the coordinate $Y_p$ while the voltage between conductors 54 and 64 will be proportional to the coordinate $Y_c$, as derived from the equation $Y_c = mx + b$. The voltage across terminals 66, 44 will be proportional to the difference of the two Y coordinates and may be used as an error voltage for application to an amplifier 68 and thence to an automatic steering device 70 which may be one of the many known to the art.

The error voltage may alternatively or simultaneously be indicated on a zero centered meter, which will thus indicate the direction and magnitude of the positional error.

If desired the X and Y motors and the position plotting mechanism associated therewith may be omitted, although the presence of the chart 10 with its visual indication of the condition of correspondence between the desired track and the vehicle's position provides a valuable visual check on the performance of the system.

Figure 3:
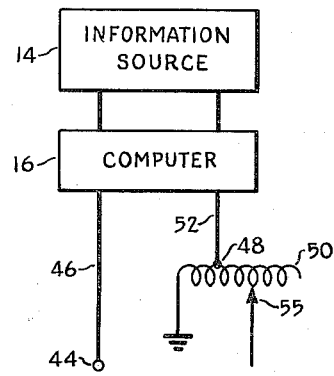
Fig. 3 is a schematic diagram of a modification of the system of Fig. 2.

For example, in Fig. 3 is shown a modification of the system of Fig. 2, in which the voltages proportional to X and $Y_p$ are taken directly from the computer 16. The voltage proportional to X is applied to the tapping point 48 of coil 50 through lead 52. The voltage proportional to $Y_p$ is applied to the terminal 44 by lead 46. If it is desired to retain the position plotting mechanism of Fig. 2 with this arrangement the leads 46 and 52 may be connected also to the X and Y motors, the follow-up voltages intercepted across potentiometers 32 and 34 being applied to the motors rather than to the computer.

While the disclosure has been restricted to two embodiments of the invention, which are now preferred, many variations therefrom falling within the scope of the appended claims will occur to those skilled in the art. It is therefore to be understood that the scope of the invention is not to be considered as restricted to the embodiments disclosed herein.

What is claimed is:

1. In a system for the navigational control of a moving vehicle: a chart of the area being traversed; means deriving from information establishing the present position of said vehicle with respect to one or more points of known location in said area, voltages proportional to the rectangular coordinates of said present position, with respect to a coordinate system referred to a point of said chart, said voltages being in terms of a selected voltage-distance scale; means deriving a voltage proportional, in terms of said scale, to the intercept of a desired navigational track along one of the axes of said coordinate system; means deriving a voltage, in terms of said scale, proportional to the product of the tangent of the angle intercepted by said track with the remaining axis of said coordinate system and the coordinate of said present position along said remaining axis; means combining said voltages proportional to said intercept and said product; and means comparing said combined voltage and said voltage proportional to the rectangular coordinate of the present position along said one coordinate axis and deriving from said comparison an error voltage indicative of the magnitude and direction of the positional error of said present position with respect to the position of said track defined by said combined voltage.

2. In a system for the navigational control of a moving vehicle: a chart of the area being traversed; a computer deriving from information establishing the present position of said vehicle with respect to one or more points of known location in said area voltages proportional to the rectangular coordinates of said present position, with respect to a coordinate system referred to a point of said chart; an electrical circuit; voltage sources applying to said circuit in a combining sense a voltage proportional to the intercept of a desired navigational track along one of the axes of said coordinate system, and a voltage proportional to the product of the tangent of the angle intercepted by said track with the remaining axis of said coordinate system and the coordinate of said present position along said remaining axis; said computer being connected to apply to said circuit in a subtractive sense the voltage generated thereby which is proportional to the coordinate of said present position along said one coordinate axis.

3. In a system for the navigational control of a moving vehicle: a chart of the area being traversed; means deriving from information establishing the present position of said vehicle with respect to one or more points of known location in said area voltages proportional to the rectangular coordinates of said present position as referred to a point of said chart, in terms of a selected voltage-distance scale; means deriving a voltage proportional, with respect to said scale, to one of the rectangular coordinates of a selected position lying on a desired navigational track traversing said chart, said position being so selected that its remaining rectangular coordinate is identical with the corresponding coordinate of said present position; and means electrically comparing said voltages and deriving from said comparison an error voltage indicative of the magnitude and direction of the error of said present position with respect to said selected position.

4. In a system for the navigational control of a moving vehicle: means deriving, from information establishing the present position of said vehicle with respect to one or more points of known location within an area being traversed voltages proportional to the rectangular coordinates of said position, in terms of a selected voltage-distance scale; means deriving a voltage proportional, with respect to said scale, to one of the rectangular coordinates of a selected position lying on a desired navigational track, said position being so selected that its remaining rectangular coordinate is identical with the corresponding coordinate of said present position; and means electrically comparing said voltages and deriving from said comparison an error voltage indicative of the magnitude and direction of the error of said present position with respect to said selected position.

5. A method of deriving a voltage for the navigational control of a moving vehicle which comprises: deriving from information establishing the present position of said vehicle with respect to one or more points of known location in an area being traversed voltages proportional to the rectangular coordinates of said present position, with respect to a coordinate system referred to a point of said area, said voltages being in terms of a selected voltage-distance scale; utilizing one coordinate of said present position to determine a position on a desired navigation track, said positions thus having a common coordinate; deriving a voltage proportional to the remaining coordinate of said determined position; and comparing the voltages proportional to the coordinates of said positions which are not common.

ARTHUR C. OMBERG.
HAROLD GOLDBERG.

No references cited.